United States Patent
Leonhardt et al.

(10) Patent No.: US 9,958,099 B2
(45) Date of Patent: May 1, 2018

(54) CAM AND GROOVE COUPLING WITH LOCKING WIRE MECHANISM

(71) Applicant: Mercedes Textiles Ltd., St. Laurent (CA)

(72) Inventors: Duane Leonhardt, Ile Bizard (CA); Soroush Nobari, Saint Lazare (CA)

(73) Assignee: Mercedes Textiles Ltd., St. Laurent, Quebec (CA)

( * ) Notice: Subject to any disclaimer, the term of this patent is extended or adjusted under 35 U.S.C. 154(b) by 0 days. days.

(21) Appl. No.: 15/154,569

(22) Filed: May 13, 2016

(65) Prior Publication Data

US 2016/0334041 A1    Nov. 17, 2016

Related U.S. Application Data

(60) Provisional application No. 62/161,434, filed on May 14, 2015.

(51) Int. Cl.
    *F16L 37/18*    (2006.01)

(52) U.S. Cl.
    CPC ........... *F16L 37/18* (2013.01); *F16L 2201/20* (2013.01)

(58) Field of Classification Search
    CPC ................................. F16L 37/18; F16L 37/20
    USPC ...... 285/81–82, 84–85, 87–88, 80, 309–312, 285/1, 2, 3; 24/270–272
    See application file for complete search history.

(56) References Cited

U.S. PATENT DOCUMENTS

| | | | | |
|---|---|---|---|---|
| 4,295,670 A | * | 10/1981 | Goodall | F16L 37/18 285/312 |
| 4,647,075 A | * | 3/1987 | Vargo | F16L 37/18 285/312 |
| 4,651,901 A | * | 3/1987 | Ozdemir | B65D 45/20 215/284 |
| 4,871,195 A | * | 10/1989 | Parrish | F16L 37/18 285/312 |
| 5,295,717 A | | 3/1994 | Chen | |
| 5,435,604 A | | 7/1995 | Chen | |
| 6,015,168 A | | 1/2000 | Fahl | |
| 6,022,055 A | * | 2/2000 | Coulonvaux | F16B 2/185 24/270 |
| 6,447,016 B2 | | 9/2002 | Collier | |
| 8,955,885 B2 | * | 2/2015 | Dixon | F16L 37/18 24/462 |
| 2001/0045745 A1 | * | 11/2001 | Collier | F16L 37/18 285/81 |

(Continued)

*Primary Examiner* — James M Hewitt, II
(74) *Attorney, Agent, or Firm* — Ware, Fressola, Maguire & Barber LLP

(57) ABSTRACT

A cam and groove coupling joint has a male coupling and a female coupling that includes two pairs of lugs on the body and further includes pins supported by each pair of lugs. A pair of cam arms are pivotally mounted to the pins between the lugs. The cam arms are movable between an open position in which the male coupling is free to move relative to the female coupling and a closed position in which a cam of each cam arm engages the groove to lock the male coupling inside the female coupling. A rotatable wire clip secures the cam arms in the closed position, the wire clip being rotatably connected to each lug between a secured position in which the wire clip secures the cam arm to prevent opening of the cam arm and an unsecured position in which the cam arm is free to be opened.

16 Claims, 8 Drawing Sheets

(56) References Cited

U.S. PATENT DOCUMENTS

2010/0289260 A1* 11/2010 Morton ................ F16L 23/036
285/312

* cited by examiner

CAM AND GROOVE COUPLING WITH LOCKING WIRE MECHANISM

CROSS-REFERENCE TO RELATED APPLICATIONS

This application claims priority from U.S. Provisional Patent Application 62/161,434 filed May 14, 2015.

TECHNICAL FIELD

The present invention relates generally to couplings and, in particular, to cam and groove couplings.

BACKGROUND

Cam and groove couplings, also known as cam and groove fittings, cam lock fittings, quick-connect couplings or quick-disconnect couplings, are used to connect two segments of hoses or pipes. A joint is formed by connecting a male coupling with a female coupling. Both male and female couplings are tubular and attach to the ends of a segment of hose or pipe.

The male coupling has a groove on its exterior. The female coupling has an interior diameter sufficiently large to accommodate the male coupling. The female coupling has cam arms that are pivotally mounted between two adjacent parallel lugs. There are typically two pairs of lugs on each female coupling. The two pairs of lugs are usually diametrically opposite each other on the coupling body. Each pair of lugs pivotally supports a respective cam arm assembly. The cam arms pivot on a pin between the lugs to cause the cam to engage the groove. Movement of the cam into the groove locks the male coupling inside the female coupling.

A problem that may arise with such coupling joints is that, when used on vibrating machinery, there is a concern that vibrations can cause the cam arms to open thereby causing decoupling of the joint.

Wire safety clips are inserted through holes in the lugs of the female coupling to prevent the cam arm from opening. One such wire clip is disclosed in U.S. Pat. No. 6,447,016.

A downside of conventional wire clip designs is that extra material is required over the height of the cam arm in order to provide space for the holes through which the clip is inserted. Chains are typically attached to the clips so that the clips are not lost when removed. However, a typical chain-attached clip is still not foolproof because the chain can slip off the clip. Furthermore, in cold weather, it can sometimes be difficult to align the clip with the holes when wearing gloves.

Another conventional approach to this problem is to use an internally locking mechanism such as, for example, a multi-piece spring-loaded lever. U.S. Pat. Nos. 6,015,168 and 5,435,604 and 5,295,717 disclose locking members housed inside the cam arms. However, internal locking mechanisms have their shortcomings. Not only are these costly to tool but their main drawback is they are much weaker. In some cases, e.g. in cold weather applications, the cam arms must be hammered closed. The multi-piece levers tend to be weaker and are prone to breaking.

In view of these shortcomings of the prior art, an improved locking mechanism remains highly desirable.

SUMMARY

In broad terms, one aspect of the present invention provides a novel rotatable wire clip for securing each cam arm (or lever arm) of a cam and groove coupling. This rotatable wire clip prevents the cam arm from opening accidentally due to vibration or impact.

Accordingly, one inventive aspect of the present disclosure is a cam and groove coupling joint that has a male coupling having a substantially tubular body that includes a pair of grooves in the body and a female coupling having a substantially tubular body that includes two pairs of lugs on the body and further includes pins that are supported by each pair of lugs. A pair of cam arms are pivotally mounted to the pins between the lugs. The cam arms are movable between an open position in which the male coupling is free to move relative to the female coupling and a closed position in which a cam of each cam arm engages the groove to lock the male coupling inside the female coupling. A rotatable wire clip secures the cam arms in the closed position, the wire clip being rotatably connected to each lug between a secured position in which the wire clip secures the cam arm to prevent opening of the cam arm and an unsecured position in which the cam arm is free to be opened.

This summary is provided to highlight certain significant inventive aspects but is not intended to be an exhaustive or limiting definition of all inventive aspects of the disclosure. Other inventive aspects may be disclosed in the detailed description and drawings.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals. It should furthermore be noted that the drawings are not necessarily to scale.

DETAILED DESCRIPTION OF EMBODIMENTS

In general, the embodiments of the present invention provide a rotatable wire clip for securing cam arms (lever arms) of a cam and groove coupling joint. A coupling joint is formed by coupling together a male coupling and a female coupling. The male coupling is inserted into the female coupling. Cam arms on the female coupling engage grooves in the male coupling to lock the male coupling inside the female coupling.

Figure 1:
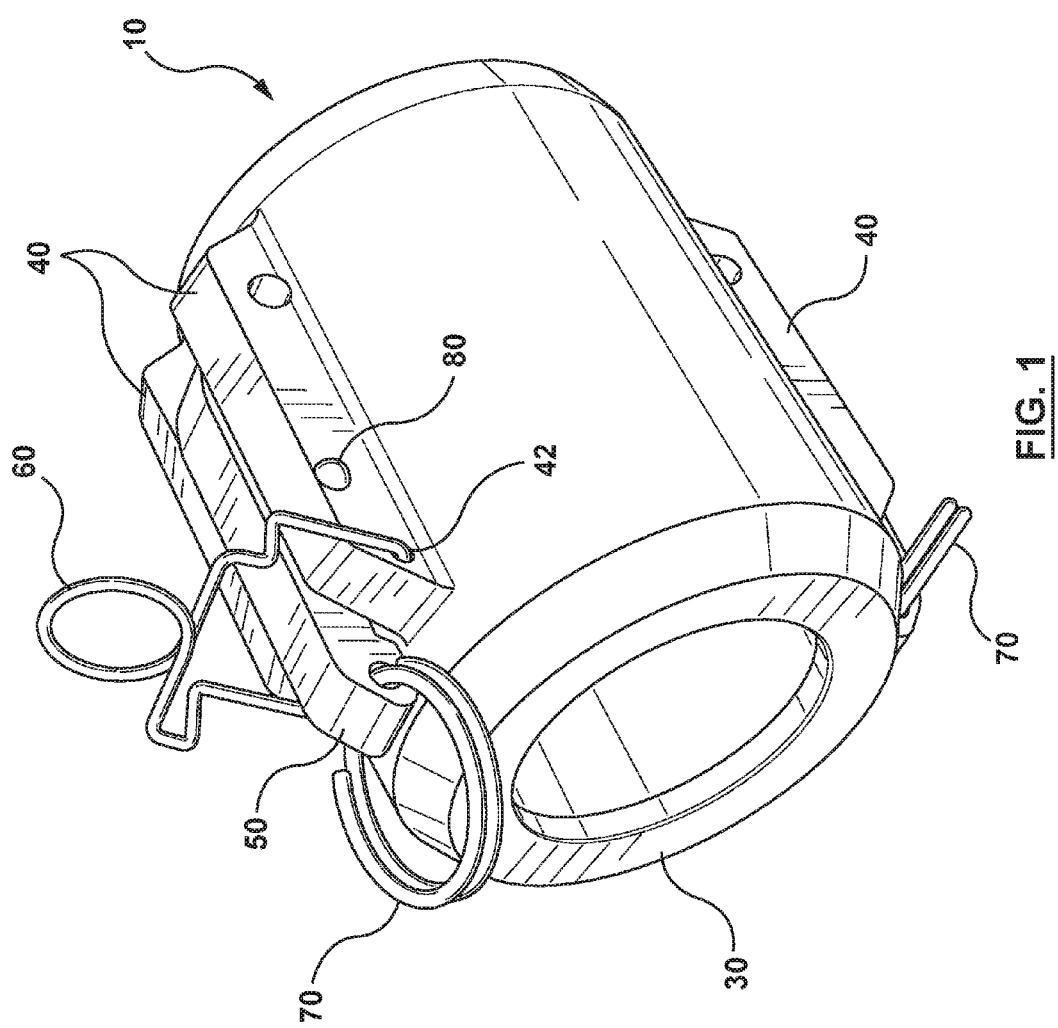
FIG. 1 is a perspective view of the cam and groove coupling joint with the rotatable wire clip in a partially open position in accordance with one embodiment of the present invention.
Figure 2:
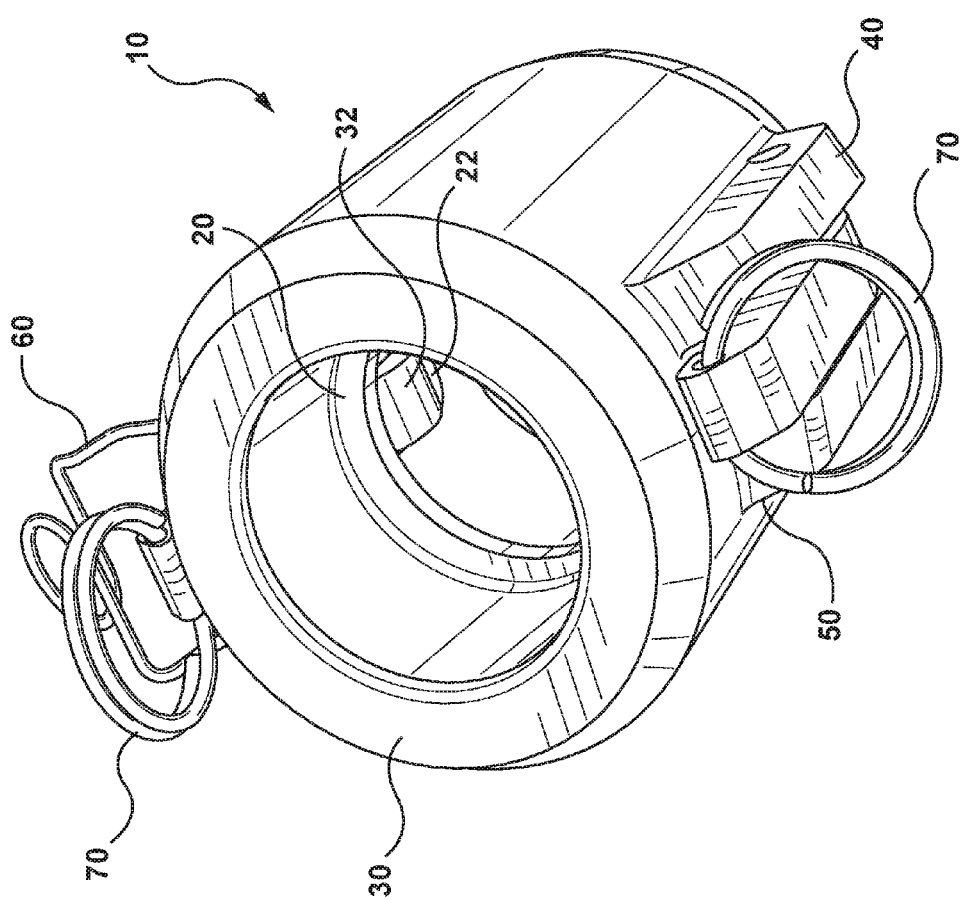
FIG. 2 is another perspective view of the cam and groove coupling joint of FIG. 1.
Figure 3:
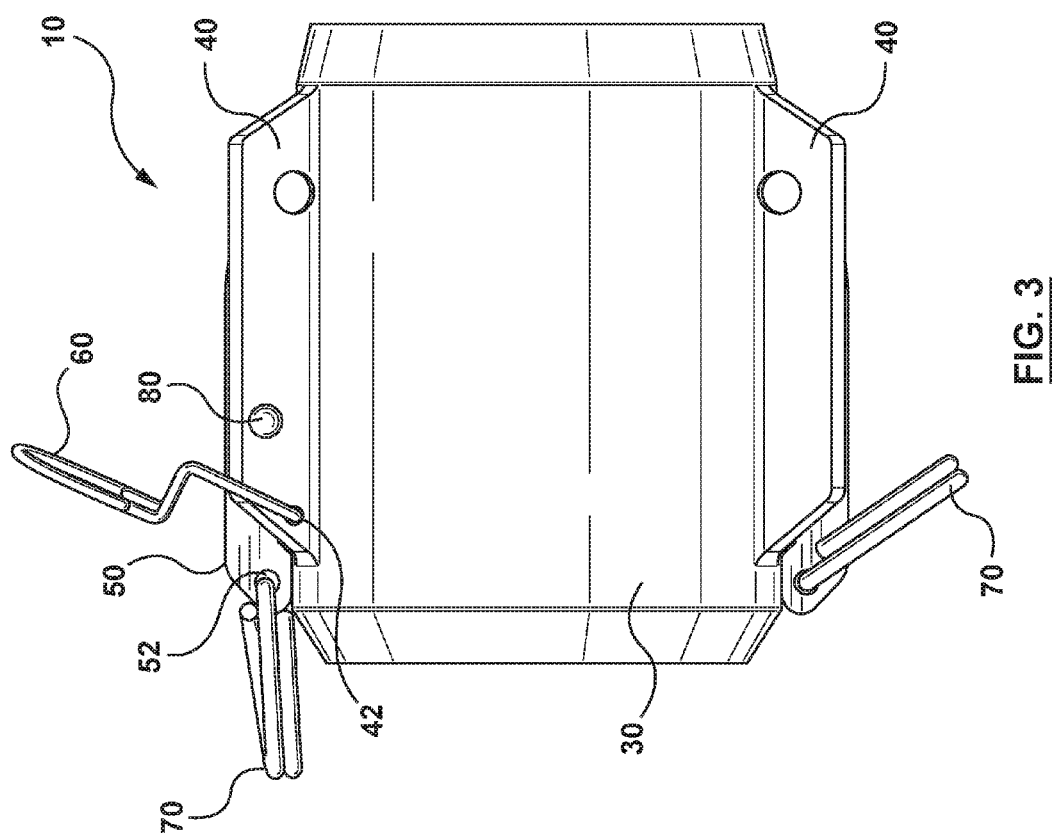
FIG. 3 is a side view of the cam and groove coupling joint of FIG. 1.
Figure 4:
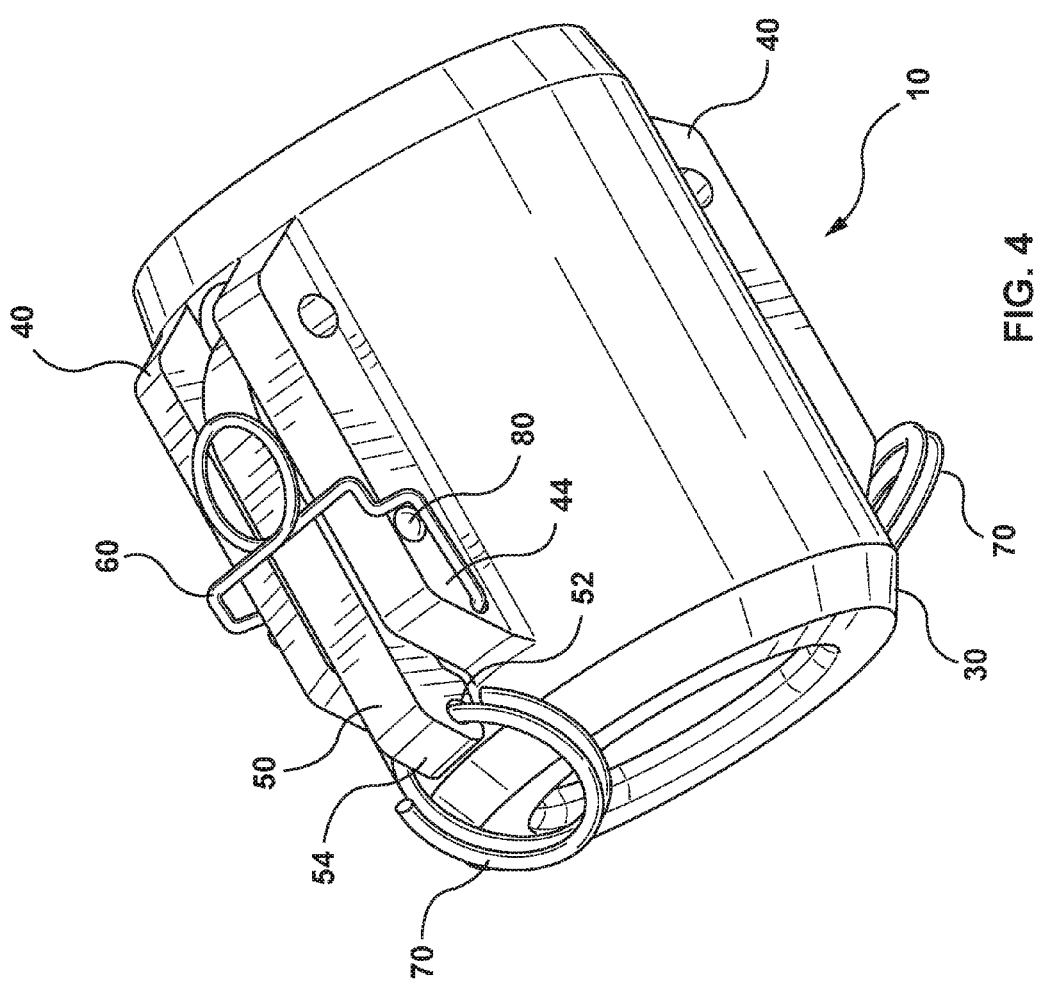
FIG. 4 is a perspective view of the cam and groove coupling joint with the rotatable wire clip in a closed, secured position.
Figure 5:
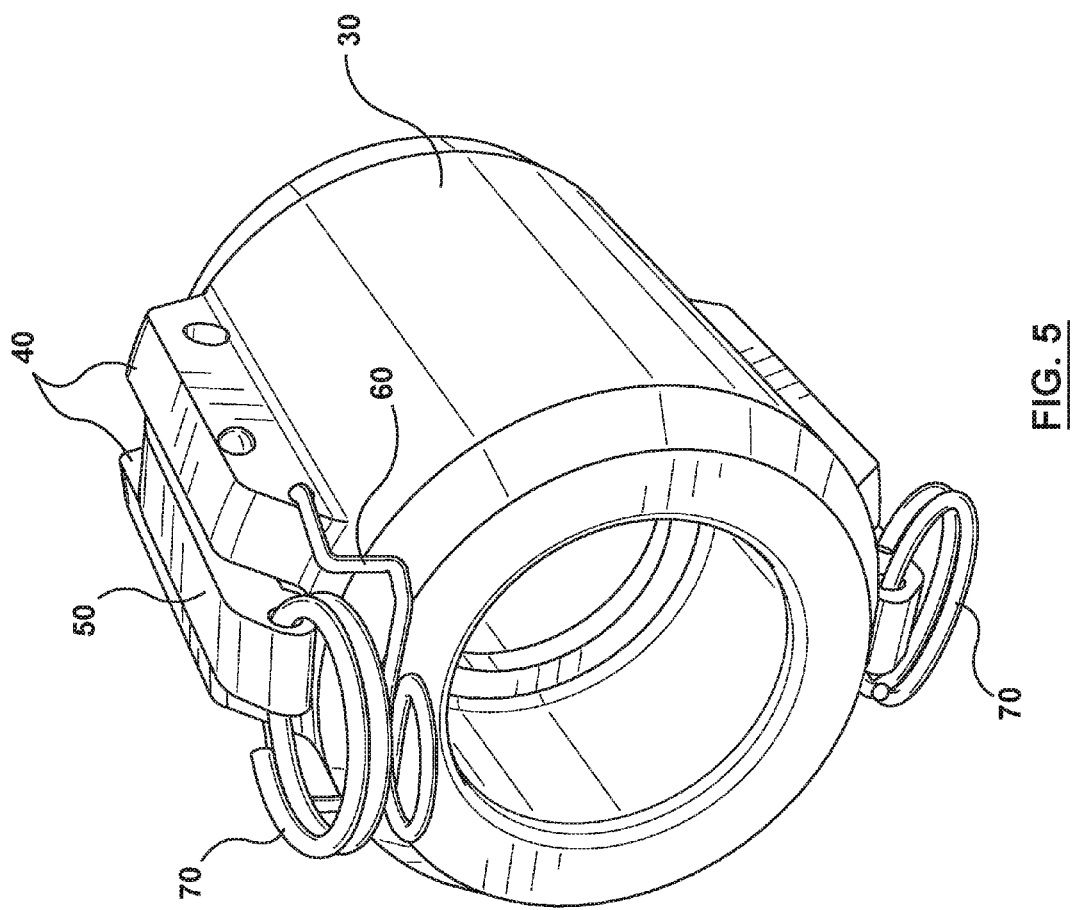
FIG. 5 is a perspective view of the cam and groove coupling joint with the rotatable wire clip in a fully open position and with the finger ring folded forward.
Figure 6:
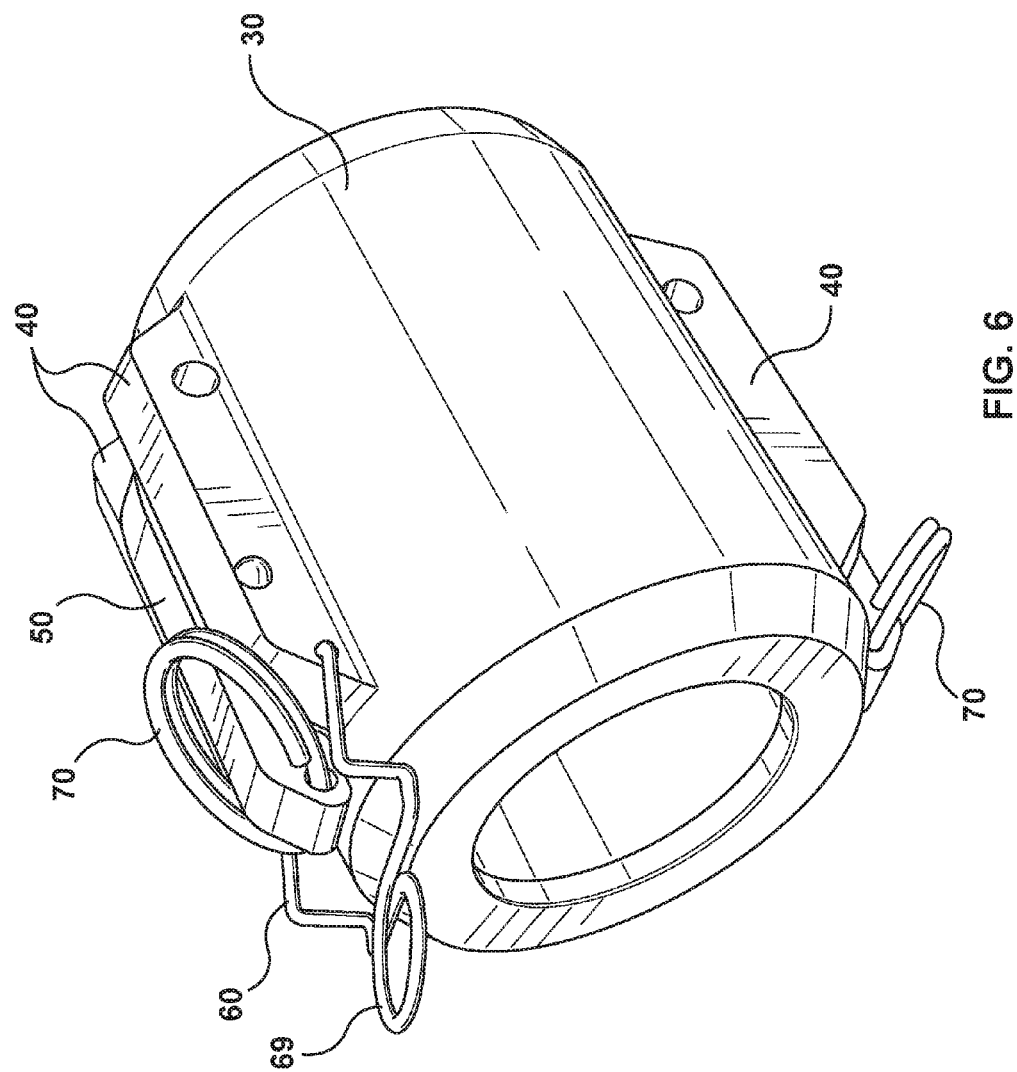
FIG. 6 is a perspective view of the cam and groove coupling joint with the rotatable wire clip in a fully open position and with the finger ring folded backward.

In the embodiment illustrated by way of example in FIGS. 1-3, a cam and groove coupling joint 10 has a male coupling 20 having a substantially tubular body that includes a pair of grooves 22 in the body and a female coupling 30 having a substantially tubular body that includes two pairs of lugs 40 on the body and further includes pins that are supported by each pair of lugs. A pair of cam arms 50 are pivotally mounted to the pins between the lugs. The cam arms are movable between an open position in which the male coupling is free to move relative to the female coupling and a closed position in which a cam 32 of each cam arm 50 engages the groove to lock the male coupling inside the female coupling. A rotatable wire clip 60 secures the cam arms in the closed position. The wire clip is rotatably connected to each lug between a secured position in which the wire clip secures the cam arm to prevent opening of the cam arm and an unsecured position in which the cam arm is free to be opened. The wire clip may be made of metal. The wire clip may be expanded laterally to fit snugly within holes 42 in the outwardly facing sides of the lugs. The rotatable wire clip 60 is shown partially open in FIGS. 1-3. Hooked through an aperture 52 in a forward end of each cam arm is a finger ring 70. Holes may be drilled into the extruded lugs in one embodiment. Pins with rounded (e.g. hemispherical) heads 80 may be fitted into these holes to provide a detent or means to force an expansion on the wire spring clip. This causes the wire clip to click as it moves from a closed to an open position and vice versa. The click (or clicking sound) of the wire clip forcing past the pin head 80 provides an audible and/or tactile signal to the user. As shown in FIG. 4, the heads 80 also keep the wire clip locked in the closed/secured position.

In the embodiment illustrated in FIGS. 1-4, the rotatable wire clip 60 is resiliently biased toward the secured position. In other words, the wire clip is mechanically biased to return to the secured position. The resilience of the wire clip may derive from a spring-loaded mechanism or the preloaded torsion in the mounting of the wire clip in the holes.

FIG. 4 illustrates the rotatable wire clip 60 in the secured (fully closed) position. In this position, the wire clip contacts the cam arm. The wire clip will oppose a force that would otherwise pull open the cam arm, be it an accidental manual effort, snagging on a foreign object, a glancing impact or the cumulative effect of vibration.

FIGS. 5-8 illustrate the rotatable wire clip 60 in its unsecured (fully open) position. To open the cam arm, the rotatable wire clip must be first rotated out of the way, i.e. rotated over the finger ring.

In the illustrated embodiment, the wire clip is rotatably mounted in outwardly facing holes 42 in the lugs. As shown, the wire clip has first segments 62 that rotate in a plane substantially parallel to a rotation plane of the cam arm, second segments 64 substantially orthogonal to the first segments, third segments 66 parallel to the first segments, fourth segments 68 substantially orthogonal to the second and third segments, the fourth segments being joined by a central loop 69.

In the illustrated embodiment, the central loop 69 is a substantially circular loop aligned with the cam arm. In another embodiment, the loop may have another shape, e.g. oval, oblong, square, rectangular, triangular, etc.

In the illustrated embodiment, the loop 69 extends longitudinally forward substantially as far as a finger ring 70 hooked onto a forward end of the cam arm. In other embodiments, the loop may extend farther than the ring or not as far.

In the illustrated embodiment, the holes 42 in the lugs are disposed radially inwardly of the aperture 52 in the cam arm through which the finger ring is hooked. "Radially inwardly" means closer to the central longitudinal axis of the coupling joint. As shown, the aperture 52 is also forward of the holes 42.

Figure 7:
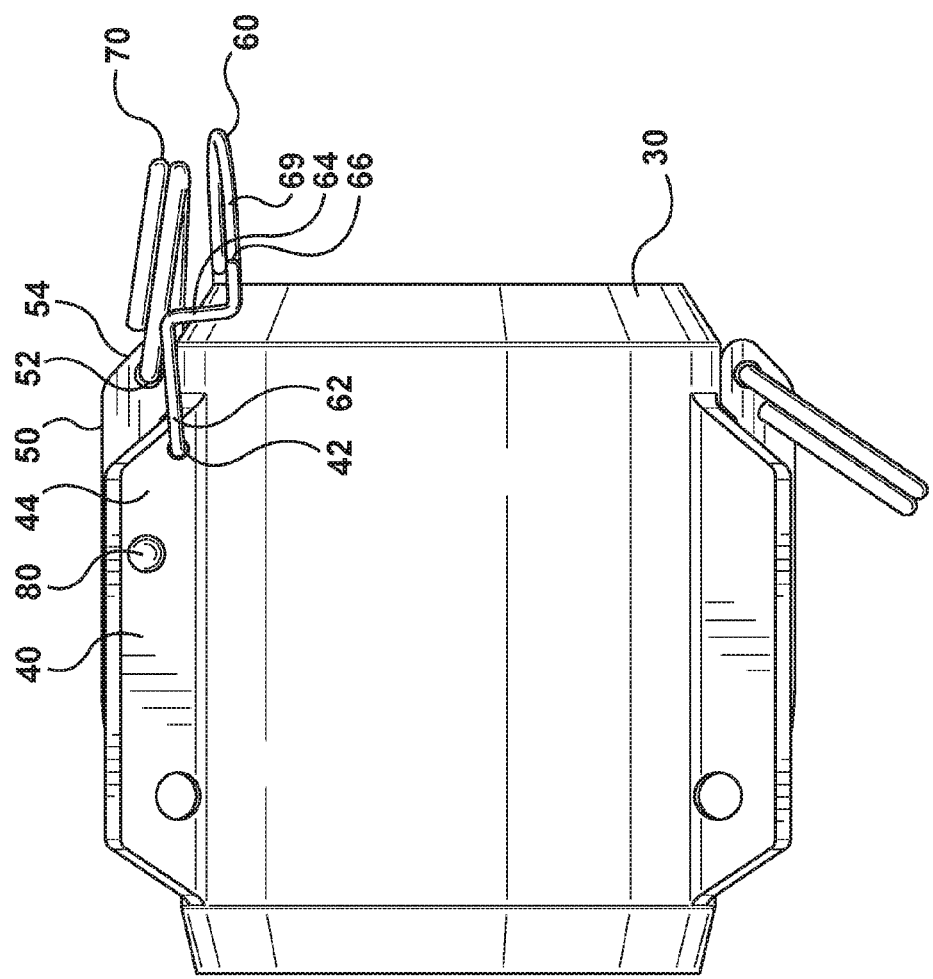
FIG. 7 is a side view of the cam and groove coupling joint of FIG. 5.
Figure 8:
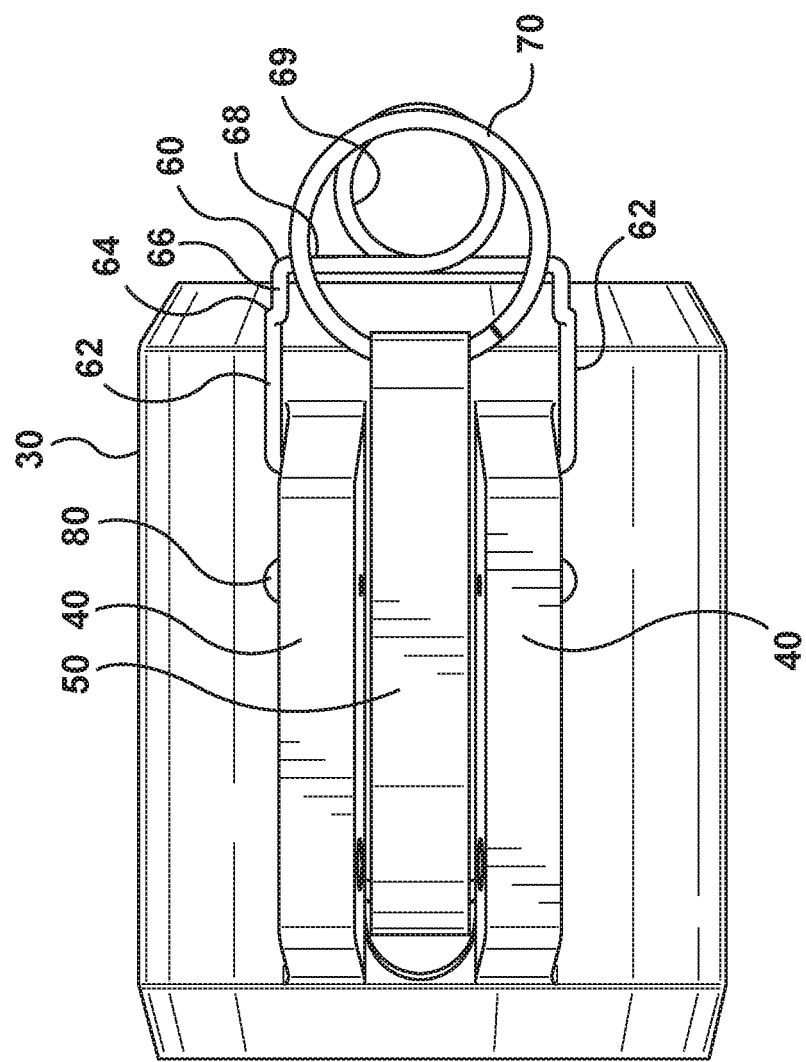
FIG. 8 is a side view of the cam and groove coupling joint of FIG. 5.

In the illustrated embodiment, the first, second and third segments of the wire form an offset to fit over a forward edge of the coupling joint. The forward edge or forward face of the coupling joint shall be considered to be the side where the finger rings are attached when the levers are down in the closed position In the illustrated embodiment, the first, second and third segments of the wire form an offset to fit over a forward bevelled edge of the coupling joint such that the loop is angled upwardly with respect to a central longitudinal axis of the joint as illustrated in FIG. 7.

In the illustrated embodiment, the holes 42 are in the forwardly ramped portion 44 of the lug. Likewise, the aperture 52 is in the forwardly ramped portion of the cam arm. As shown by way of example in FIG. 8, the diameter of the loop 69 is smaller than the diameter of the finger ring. However, the width of the gap between the first arms 62 is greater than the diameter of the finger ring. Similarly, the height of the fourth segments (that form a cross bar) relative to the holes 42 may be greater than the diameter of the ring. Due to their sizes and relative mounting positions, the loop engages the ring over a certain range of angles but then passes over the ring beyond a certain angle.

In the illustrated embodiment, the wire clip is made of a single length of metal wire. In another embodiment, the wire clip may be made of two or more lengths of wire which are soldered or otherwise joined together.

The embodiments described and illustrated herein secure, hold or restrain the cam arm to prevent it from opening. To open the cam arms, each wire clip is rotated over the finger ring. After the wire clip has been rotated over the finger ring, the spring-like resilience of the wire clip causes the wire clip to rotate naturally (automatically) back to the secured position. Once the wire clip has rotated over the finger ring, the wire clip will prevent the lever arm (cam arm) from being opened/unlocked.

Even with a severe load (which is not likely to arise from vibration and gravity) the lever arm cannot overcome the wire clip as the wire clip will rise to meet the angle versus load to stop it. The only way to open the lever arm is to rotate the wire clip fully back and then to open the lever arm. This novel lever-securing mechanism enables easy one-handed operation. Since the clip is permanently mounted to the coupling, it remains attached at all times, ensuring that the clip is never lost. Moreover, since there is no chain dangling from the clip, there are no unwanted vibrations from the dangling chain.

It is to be understood that the singular forms "a", "an" and "the" include plural referents unless the context clearly dictates otherwise. Thus, for example, reference to "a device" includes reference to one or more of such devices, i.e. that there is at least one device. The terms "comprising", "having", "including" and "containing" are to be construed as open-ended terms (i.e., meaning "including, but not limited to,") unless otherwise noted. All methods described herein can be performed in any suitable order unless otherwise indicated herein or otherwise clearly contradicted by context. The use of examples or exemplary language (e.g.

"such as") is intended merely to better illustrate or describe embodiments of the invention and is not intended to limit the scope of the invention unless otherwise claimed.

The present invention has been described in terms of specific embodiments, examples, implementations and configurations which are intended to be exemplary or illustrative only. Other variants, modifications, refinements and applications of this innovative technology will become readily apparent to those of ordinary skill in the art who have had the benefit of reading this disclosure. Such variants, modifications, refinements and applications fall within the ambit and scope of the present invention. Accordingly, the scope of the exclusive right sought by the Applicant for the present invention is intended to be limited solely by the appended claims and their legal equivalents.

The invention claimed is:

1. A cam and groove coupling joint comprising:
a male coupling having a substantially tubular body that includes a pair of grooves in the body;
a female coupling having a substantially tubular body that includes two pairs of lugs on the body and further includes pins that are supported by each pair of lugs;
a pair of cam arms pivotally mounted to the pins between the lugs, the cam arms movable between an open position in which the male coupling is free to move relative to the female coupling and a closed position in which a cam of each cam arm engages the groove to lock the male coupling inside the female coupling; and
a rotatable wire clip for securing the cam arms in the closed position, the wire clip being rotatably connected to each lug by a hole in each lug so as to be rotatable between a secured position in which the wire clip secures the cam arm to prevent opening of the cam arm and an unsecured position in which the cam arm is free to be opened, wherein the wire clip remains connected to each lug when in the unsecured postion.

2. The coupling joint as claimed in claim 1 wherein the rotatable wire clip is resiliently biased toward the secured position.

3. The coupling joint as claimed in claim 1 wherein the wire clip is rotatably mounted in outwardly facing holes in the lugs, the wire clip comprising first segments that rotate in a plane substantially parallel to a rotation plane of the cam arm, second segments substantially orthogonal to the first segments, third segments parallel to the first segments, fourth segments substantially orthogonal to the second and third segments, the fourth segments being joined by a central loop.

4. The coupling joint as claimed in claim 3 wherein the central loop is a substantially circular loop aligned with the cam arm.

5. The coupling joint as claimed in claim 4 wherein the loop extends longitudinally forward substantially as far as a finger ring hooked onto a forward end of the cam arm.

6. The coupling joint as claimed in claim 5 wherein the holes in the lugs are disposed radially inwardly of the aperture in the cam arm through which the finger ring is hooked.

7. The coupling joint as claimed in claim 3 wherein the first, second and third segments of the wire clip form an offset to fit over a forward edge of the coupling joint.

8. The coupling joint as claimed in claim 3 wherein the first, second and third segments of the wire clip form an offset to fit over a forward bevelled edge of the coupling joint such that the loop is angled upwardly with respect to a central longitudinal axis of the joint.

9. The coupling joint as claimed in claim 1 wherein the holes are in the forwardly ramped portion of the lug.

10. The coupling joint as claimed in claim 1 wherein the wire clip is made of a single length of metal wire.

11. The coupling joint as claimed in claim 1 wherein the lugs have pins having heads that provide a detent that forces expansion of the wire clip as it passes over the heads.

12. A cam and groove coupling joint comprising:
a male coupling having a substantially tubular body that includes a pair of grooves in the body;
a female coupling having a substantially tubular body that includes two pairs of lugs on the body and further includes a pin supported by each pair of lugs;
a cam arm pivotally mounted to each pin between each pair of the lugs, the cam arm pivotable about a first axis, the arm being pivotable between an open position in which the male coupling is free to move relative to the female coupling and a closed position in which a cam of each cam arm engages the groove to lock the male coupling inside the female coupling; and
a rotatable wire clip rotatably mounted to the lugs via holes in the lugs for securing the cam arm in the closed position, the wire clip being rotatable about a second axis parallel to the first axis, wherein the rotatable wire clip is rotatable between a secured position in which the wire clip secures the cam arm to prevent opening of the cam arm and an unsecured position in which the cam arm is free to be opened, wherein the wire clip remains connected to each lug when in the unsecured position.

13. The coupling joint as claimed in claim 12 wherein each lug comprises a detent on an outer surface of the lug.

14. The coupling joint as claimed in claim 13 wherein the detent is disposed between the first axis and the second axis.

15. The coupling joint as claimed in claim 12 wherein the wire clip rotates toward the first axis to secure the cam arm.

16. The coupling joint as claimed in claim 12 wherein the cam arm rotates in a first direction to lock and a second direction to unlock, and wherein the wire clip rotates in the second direction to secure the cam lock and rotates in the first direction to move to the unsecured position.

* * * * *